U S010971762B2

United States Patent
Drews et al.

(10) Patent No.: US 10,971,762 B2
(45) Date of Patent: Apr. 6, 2021

(54) ELECTRODE DESIGN FOR L-ION BATTERY

(71) Applicant: FORD GLOBAL TECHNOLOGIES, LLC, Dearborn, MI (US)

(72) Inventors: Andrew Robert Drews, Ann Arbor, MI (US); Venkataramani Anandan, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 65 days.

(21) Appl. No.: 15/668,876

(22) Filed: Aug. 4, 2017

(65) Prior Publication Data

US 2019/0044193 A1    Feb. 7, 2019

(51) Int. Cl.
*H01M 10/42*    (2006.01)
*H01M 10/0525*    (2010.01)
*H01M 4/587*    (2010.01)

(52) U.S. Cl.
CPC ... *H01M 10/4235* (2013.01); *H01M 10/0525* (2013.01); *H01M 4/587* (2013.01)

(58) Field of Classification Search
CPC ......... H01M 10/0525; H01M 10/4235; H01M 4/587; H01M 10/0567; H01M 2004/027; H01M 2004/028; H01M 2300/0025; H01M 4/131; H01M 4/133; H01M 4/136; H01M 4/505; H01M 4/525; H01M 4/5825
See application file for complete search history.

(56) References Cited

U.S. PATENT DOCUMENTS

| | | | |
|---|---|---|---|
| 7,563,541 B2 | 7/2009 | Howard et al. | |
| 8,334,069 B2 | 12/2012 | Mizutani et al. | |
| 9,203,085 B2 | 12/2015 | Jung et al. | |
| 2006/0275661 A1* | 12/2006 | Kim | C08F 220/18 429/217 |
| 2009/0117467 A1* | 5/2009 | Zhamu | H01M 4/133 429/231.8 |
| 2016/0372784 A1 | 12/2016 | Hayner et al. | |

FOREIGN PATENT DOCUMENTS

JP    2003068283 A  *  3/2003  .......... H01M 4/0402

OTHER PUBLICATIONS

In et al., machine translation of JP 2003-068283 A, 2003 (Year: 2003).*

* cited by examiner

*Primary Examiner* — Adam A Arciero
(74) *Attorney, Agent, or Firm* — David B. Kelley; Brooks Kushman P.C.

(57) ABSTRACT

A Li-ion battery includes a cathode; an anode having a primary active material, conductive carbon, binder, and reserve material; and a separator between the cathode and anode. The reserve material has a reaction potential between a lithium reaction potential and a primary active material reaction potential. The reserve material is configured to intercalate with lithium at the reaction potential responsive to the primary active material being fully intercalated to inhibit lithium plating on the anode.

3 Claims, 3 Drawing Sheets

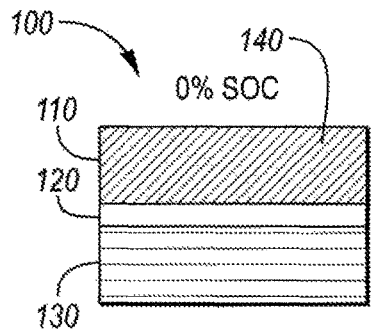
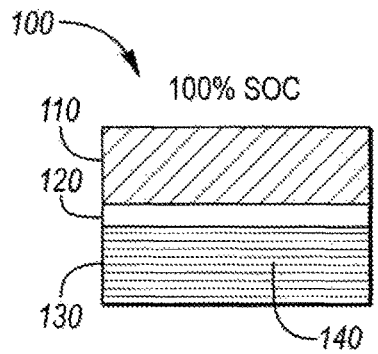
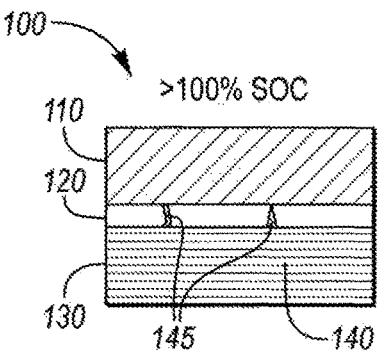
FIG. 1A
*(PRIOR ART)*
FIG. 1B
*(PRIOR ART)*
FIG. 1C
*(PRIOR ART)*
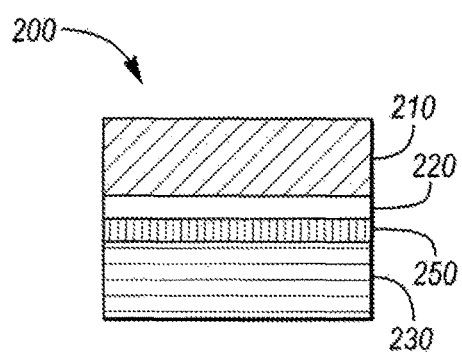
FIG. 2
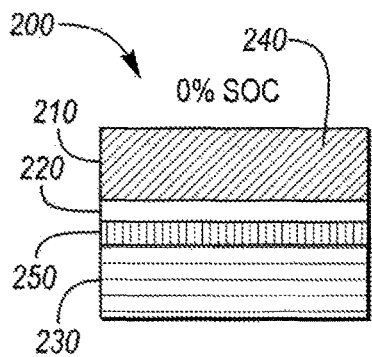
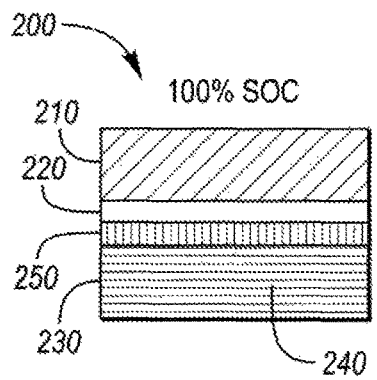
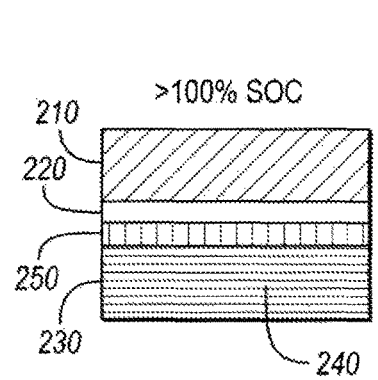
FIG. 3A
FIG. 3B
FIG. 3C

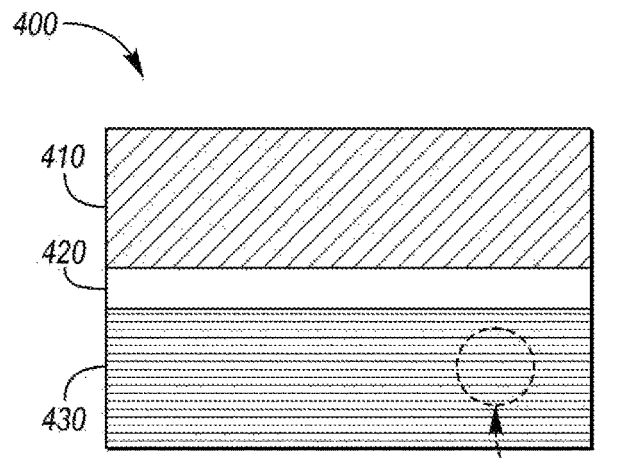

ELECTRODE DESIGN FOR L-ION BATTERY

TECHNICAL FIELD

The present disclosure relates to electrodes for lithium ion batteries, particularly to a reserve material.

BACKGROUND

Lithium-ion (Li-ion) batteries, or cells, have become an integral part in most of the devices ranging from smart phones to electric vehicles. Though they offer high energy and power density.

Conventional Li-ion batteries generally include a positive electrode (cathode), a negative electrode (anode), a separator, and an electrolyte. Current collectors are typically attached to each electrode in order to extract current from the battery. In conventional Li-ion batteries, the anode often includes graphite as a primary active material, which has a capacity of about 375 mAh/g. Graphite has a low discharge voltage (or reaction potential), which provides a large voltage difference between itself and the cathode, and therefore a relatively high power and energy density. During charging of a conventional Li-ion battery containing a graphite anode, lithium ions intercalate into the graphite structure at a low potential (about 0.1V) versus lithium (and lithium ions). This process would normally continue until all the available lithium ions from the cathode are intercalated into the graphite and the cell reaches 100% state of charge (SOC) (or is fully intercalated), as shown in FIG. 1.

In a properly designed cell, the anode capacity is intentionally designed to exceed the available lithium provided by the cathode such that all the lithium can be fully accommodated in the graphite. However, during charging at low temperatures or at high rates, the potential at the anode in a conventional cell can drop below 0.1 V, and may even drop below 0 V, leading to lithium plating on the surface of the anode, as shown in FIG. 1. One of the primary issues with lithium plating is an internal short circuit between the electrodes, induced by formation of fine filaments of lithium (dendrites) that pierce the separator, eventually reaching the cathode. Though lithium plating may occur at any part of the anode structure, it is more likely to occur at the interface between separator and anode, and particularly at sharp edges or protrusions on the surface of the anode or separator. Lithium plating forming the dendrites can occur at the anode surface due to a poor cell design, and more particularly when the cell is charged at low temperatures and high charge rates.

In addition to lithium plating low temperature and high charge rate conditions, degradation of the graphite's capacity may lead to it becoming insufficient to accommodate all the cycled lithium. As such, lithium plating may also lead to capacity loss and increased impedance in the cell.

SUMMARY

According to an embodiment, a Li-ion battery is disclosed. The Li-ion battery includes a cathode; an anode having a primary active material, conductive carbon, binder, and reserve material; and a separator between the cathode and anode. The reserve material has a reaction potential between a lithium reaction potential and a primary active material reaction potential. The reserve material is configured to intercalate with lithium at the reaction potential responsive to the primary active material being fully intercalated to inhibit lithium plating on the anode.

According to one or more embodiments, the reaction potential of the reserve material may be between about 0 and 0.1 volts. The reaction potential of the reserve material may be between about 0.005 and 0.1 volts. The reserve material may be SrO, $Mn_4N$, $K_2SO_4$, $CaCl_2$, $CaF_2$, $SrF_2$, Ag, Mg, or Zn. In some embodiments, the reserve material may irreversibly intercalate or de-intercalate with the lithium. In other embodiments, the reserve material may reversibly intercalate or de-intercalate with the lithium. In one or more embodiments, the reserve material may be mixed with the primary active material, conductive carbon, and binder. The reserve material may form a layer on a surface of the anode between the anode and separator.

According to another embodiment, a Li-ion battery is disclosed. The Li-ion battery includes a cathode; an anode having a primary active material, conductive carbon, binder, and reserve material; and a separator between the cathode and anode. The reserve material of the anode has a reaction potential with lithium between about 0 volts and 0.1 volts. The reserve material is configured to intercalate with lithium at the reaction potential to inhibit lithium plating on the anode.

According to one or more embodiments, the reserve material may be mixed with the primary active material, conductive carbon, and binder. In other embodiments, the reserve material may form a layer on a surface of the anode between the anode and separator. In one or more embodiments, the reserve material may be SrO, $Mn_4N$, $K_2SO_4$, $CaCl_2$, $CaF_2$, $SrF_2$, Ag, Mg, or Zn. The reaction potential of the reserve material may be between about 0.005 and 0.1 volts. In some embodiments, the reserve material may reversibly intercalate or de-intercalate with the lithium. In other embodiments, the reserve material may irreversibly intercalate or de-intercalate with the lithium.

According to an embodiment, a method of operating a Li-ion battery is disclosed. The method includes, responsive to a primary active material in an anode of the battery being fully intercalated and an anode potential of the battery dropping below a primary active material potential, intercalating an anode reserve material with lithium. The anode reserve material has a reaction potential between a lithium reaction potential and the primary active material potential, to inhibit lithium plating on the anode.

According to one or more embodiments, the reaction potential of the anode reserve material may be between about 0 and 0.1 volts. In some embodiments, the anode may include the anode reserve material mixed with the primary active material, a conductive carbon, and a polymer binder. In other embodiments, the anode reserve material may form a layer disposed on a surface of the anode between the anode and a separator. The anode reserve material may be SrO, $Mn_4N$, $K_2SO_4$, $CaCl_2$, $CaF_2$, $SrF_2$, Ag, Mg, or Zn.

BRIEF DESCRIPTION OF THE DRAWINGS

FIGS. 1A, 1B, and 1C are schematic illustrations of the charging process of a conventional Li-ion cell at 0%, 100%, and more than 100% SOC, respectively.

FIG. 2 is a schematic illustration of a Li-ion cell according to an embodiment

FIGS. 3A, 3B, and 3C are schematic illustrations of the charging process of a Li-ion cell at 0%, 100%, and more than 100% SOC, respectively, according to an embodiment.

FIG. 4A is a schematic illustration of a Li-ion cell according to another embodiment.

FIG. 4B is a detailed view of a portion of the schematic illustration of FIG. 4A.

FIGS. 5A, 5B, and 5C are schematic illustrations of volume change accountability during the charging process of a Li-ion cell at 0%, 100%, and more than 100% SOC, respectively, according to an embodiment.

FIG. 6 is a graph of potential against state of charge for various n/p ratios.

DETAILED DESCRIPTION

Figure 7A:
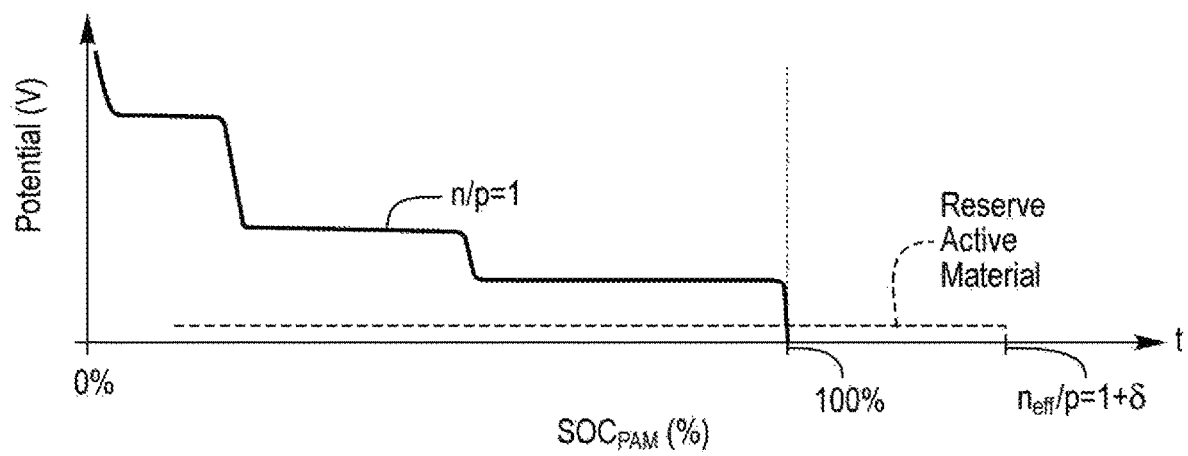
FIGS. 7A and 7B are graphs of potential against state of charge for different types of active material.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Conventional Li-ion battery electrodes operate by intercalation of lithium ions, wherein the lithium ions are extracted from the anode and migrate to the cathode during discharge and are extracted from the cathode and migrate to the anode during charging. With reference to FIGS. 1A-C, the charging process a conventional Li-ion battery 100 is shown. The conventional Li-ion battery 100 include a positive electrode (cathode) 110, a separator 120, a negative electrode (anode) 130, and an electrolyte (not shown). Current collectors (not shown) are typically attached to each electrode in order to extract current from the battery. In conventional Li-ion battery 100, the anode 130 often includes graphite as a primary active material, as well as a conductive material (such as conductive carbon), and a binder (such as a polymer binder). At 0% state of charge (SOC) as shown in FIG. 1A, lithium (lithium ions) 140 are in the cathode 110. During charging, the lithium 140 intercalates into the graphite of the anode 130. At 100% SOC, as shown in FIG. 1B, the lithium 140 is in the fully intercalated graphite in anode 130. When the SOC exceeds 100%, as shown in FIG. 1C, conventional Li-ion battery 100 undergoes lithium plating 145 on the anode 130. Because of the operating conditions of the conventional Li-ion battery 100 (such as low temperature or high charge rate), the potential drops below that of the graphite, and since the lithium 140 is fully intercalated in the anode 130, it forms dendrites as it plates in the interface between anode 130 and separator 120. As the lithium plating 145 grows, it may pierce the separator 120 and reach the cathode 110, causing a short circuit in the conventional Li-ion battery 100.

According to one or more embodiments, a Li-ion battery design for reducing lithium plating at the anode is disclosed. The anode includes an additional active material, called a reserve active material, or reserve material, which exhibits an intercalation, alloying, or reaction potential with lithium between the potential of the primary active material (graphite) and lithium metal, and has the ability to react with a significant fraction of the total available lithium at that potential. Although graphite is disclosed as the primary active material, graphite is not intended to be limiting, and any primary active material known to one skilled in the art may be used according to the embodiments. Although intercalation, alloying, and reaction potential may have thermodynamic implications, the term "reaction potential" is used hereinafter to include each potential. When the primary active material is graphite, the reserve material has a primary active material reaction potential (or reaction potential) between the lithium reaction potential (about 0 volts) and the graphite reaction potential (about 0.1 volts). The reserve material exhibits a reaction potential with lithium between about 0V and 0.1V such that it intercalates with lithium when the cell potential drops at 100% SOC (when the graphite is fully intercalated) in order to inhibit lithium plating on the anode. The reserve material may either exhibit a reversible reaction (such that the reserve material intercalates and de-intercalates with lithium), or an irreversible reaction with lithium. The reserve material may be integrated into Li-ion cell as a layer (FIG. 2) between the anode and separator or it could be mixed directly with graphite particles into the anode itself (FIGS. 4A-B). Non-limiting examples of the reserve material are listed in Table-1:

| Reserve Active Material | Voltage (V) | Capacity (mAh/g) |
|---|---|---|
| SrO | 0.005 | 517 |
| $Mn_4N$ | 0.08 | 344 |
| $K_2SO_4$ | 0.005 | 309 |
| $CaCl_2$ | 0.098 | 483 |
| $CaF_2$ | 0.025 | 687 |
| $SrF_2$ | 0.067 | 427 |
| Ag | 0.04, 0.12 | 1158 |
| Mg | 0.05 | 3350 |
| Zn | 0.06, 0.19, 0.21 | |

According to one or more embodiments, as shown in FIG. 2, a Li-ion battery (or cell) 200 includes a cathode 210, a separator 220, and an anode 230. The anode 230 includes, but is not limited to, a primary active material, such as graphite, a conductive material, and a binder. The conductive material may be, but is not limited to, a conductive carbon, such as amorphous carbon. The binder may be, but is not limited to, a polymer binder. The anode also includes a reserve active material, or reserve material 250. In an embodiment, the reserve material 250 is provided as a layer on the anode 230 surface, at the separator 220 and anode 230 interface.

FIGS. 3A-C show the charging process of the Li-ion battery 200 at 0% (FIG. 3A), at 100% (FIG. 3B), and more than 100% SOC (FIG. 3C). When anode 230 of Li-ion battery 200 is fully intercalated with lithium 240 as shown by FIG. 3B, either due to a poor design or due to excessive capacity loss, the charging potential at the anode 230 may be driven beyond the 100% SOC, as in conventional Li-ion cells. Beyond 100% SOC, the potential at the anode 230 containing the reserve material 250 will drop to the intercalation potential of the reserve material 250, instead of the primary active material, at which the lithium ions will begin to react with the reserve material 250 to intercalate the reserve material 250 layer with lithium 260, instead of plating as lithium metal at the anode 230 surface, as shown by FIG. 3C. Assuming an unlimited amount of lithium is delivered from the cathode 210 to the anode 230, this process will continue beyond 100% SOC until all the reserve material 250 is used, and only then will the potential of cell 200 drop to 0 V, leading to lithium plating. For a cell 200 with a cathode 210 capacity that is larger than, but close to the capacity of the anode 230, the integration of the reserve material 250 may help reduce the amount of plating compared to a conventional Li-ion battery.

FIGS. 4A-B show a Li-ion battery 400 according to another embodiment. Li-ion battery 400 includes a cathode 410, a separator 420, and an anode 430. The anode 430 includes, but is not limited to, a primary active material 452, such as graphite, a conductive material 454, and a binder (not shown). The conductive material 454 may be, but is not limited to, a conductive carbon, such as amorphous carbon. The binder may be, but is not limited to, a polymer binder. The anode 430 also includes a reserve active material, or reserve material 450. The reserve material 250 is mixed in with the primary active material 452, conductive material 454, and binder of the anode 430. A detailed illustration of the particles of anode 430 is shown in FIG. 4B. When the reserve material 450 is mixed into the anode 430, the reserve material 450 activates any time the local potential reaches the reaction potential of the reserve material 450, regardless of the conditions at other locations in the anode 430. Thus, the overall cell performance may not be affected, and the protective effect may be viewed as occurring on an as-needed basis to protect against more gradual degradation effects.

According to an embodiment, as shown in FIGS. 5A-C, when the reserve material 550 of Li-ion battery 500 is cast as an overlayer on the anode 530, the reserve material 550 may provide a "global" protective function, activating any time the potential at the surface of the anode 530 reaches the reaction potential of the reserve material 550. Li-ion battery 500 includes a cathode 510, a separator 520, and an anode 530. The anode 530 includes, but is not limited to, a primary active material, such as graphite, a conductive material, and a binder. The conductive material may be, but is not limited to, a conductive carbon, such as amorphous carbon. The binder may be, but is not limited to, a polymer binder. The anode 530 also includes a reserve active material, or reserve material 550, layered on to the anode 530 surface interface between the separator 520 and the anode 530. When the reserve material 550 reacts with lithium, the lithiated reserve material 540 may undergo a volume change, as shown in FIG. 5B. If the reaction between lithium and the reserve material 550 results in a significant volume expansion 560 as shown in FIG. 5C, the initiation of the reaction at one location on the reserve material 550 layer may significantly increase the resistance of the cell not only at that location, but in an adjacent region immediately around the initiation site. This will in turn create local overpotential that will bring additional reserve material 550 into a reaction condition, leading to a higher resistance such that the cell potential reaches the cut-off potential, causing an overall cell shutdown.

Referring again to the embodiment depicted in FIG. 2, in order to fabricate the cell design, a graphite anode layer is first fabricated by casting slurry containing graphite, carbon, polymer binder, and solvent, on a copper foil. Then, a slurry containing the reserve material, carbon, polymer binder, and solvent, is casted on the pre-casted anode layer. This dual layer anode is dried, calendared, and combined with other battery components to form a cell. The thickness and amount of reserve material will depend on the type of reserve material and the cell design. For example, if a reserve material with significant higher capacity than graphite is used, then a thin reserve layer may be sufficient to provide the desired protection. Referring again to the embodiment depicted in FIGS. 4A-B, the reserve material may be integrated into the anode by directly mixing it with the anode components during the slurry making process. First, a slurry containing graphite, the reserve material, conductive carbon, polymer binder, and solvent, is casted on a copper foil. Then the cast is dried, calendared, and combined with other battery components to form the cell.

The N/P ratio of a Li-ion cell is the ratio of capacity of the anode (or negative electrode), to the capacity of the cathode (or positive electrode). To avoid lithium plating at the anode during the charging process, the capacity of the anode is often higher than the capacity of the cathode. Using a reserve material in the anode to inhibit lithium plating may also result in the N/P ratio of anode to cathode capacity being reduced, thus lowering cost and increasing cell energy. The reserve active material may have a substantially higher specific or volumetric capacity than the primary active material of the anode, such that the amount of reserve material is less than the amount of the primary material needed to prevent reaching the voltage limit for lithium plating. Thus, the amount of primary active material may more closely approximate a loading corresponding to N/P=1, improving weight, volume, and cost when compared to conventional cells without a reserve active material.

As shown in FIG. 6, the N/P ratios are graphed for potential (V) against state of charge (% of primary active material). When N/P is less than 1 (N/P<1), lithium will plate on the anode when the cell is charged to 100% SOC because the potential will drop below that of the primary active material before reaching 100% SOC. When N/P=1, the potential at 100% SOC of the primary active material may still drop and result in lithium plating when the battery exceeds 100% SOC, which, as previously discussed, may occur due to low temperatures or high charge rates. When the N/P ratio is greater than 1 (N/P>1), beyond 100% SOC of the primary active material, the potential will hold at the intercalation potential of the primary active material, which is due to the presence of 10% excess primary active material available for intercalation, and thus lithium metal plating on the anode will not occur.

Figure 7B:
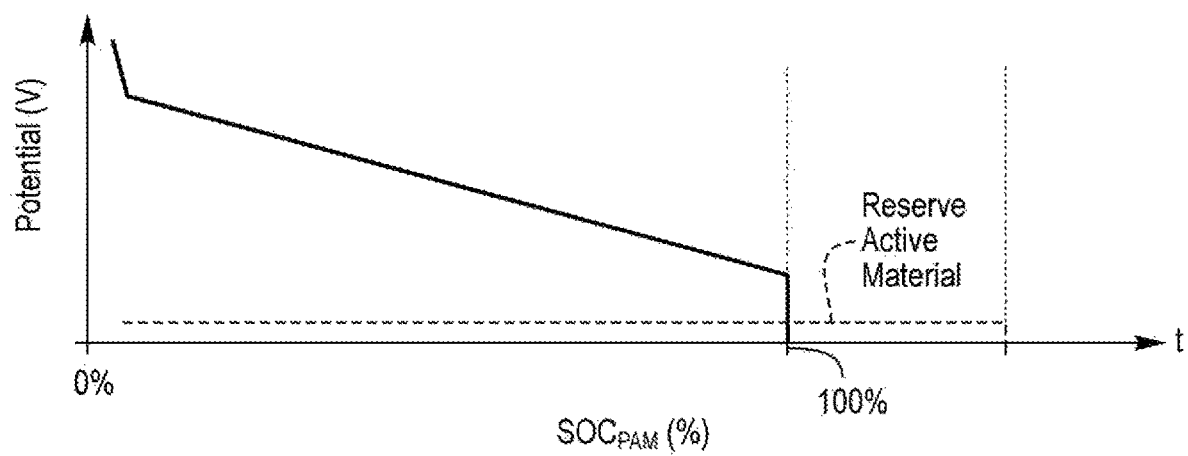

FIGS. 7A and 7B show graphs of potential against state of charge for different types of active material according to embodiments. FIG. 7A shows potential (V) against SOC of the primary active material when N/P=1. The active material is "staged" at various potentials as the cell reaches 100% SOC of the primary active material. The reaction potential of the reserve material with lithium is also shown in the graph, and is constant. When the cell reaches 100% SOC, instead of the potential dropping to zero and causing lithium plating, the potential drops and holds at the reaction potential of the reserve material until the reserve material is fully intercalated. In such cases where the anode contains both primary and reserve active materials, the effective anode capacity is the sum of the capacity of primary and reserve material, therefore having the anode has a resulting effective capacity ratio of $N_{eff}/P$ of $1+\delta$ ($N_{eff}/P=1+\delta$), where $\delta$ represents the capacity of the reserve material. FIG. 7B depicts a primary active material with a range of lithium solubility (solid solution), and as such, the potential gradually decreases (instead of stages of potential voltages). Upon the primary active material reaching 100% SOC, the potential drops to the potential of the reserve active material, delaying lithium plating on the anode until the reserve material is fully intercalated.

Figure 8:
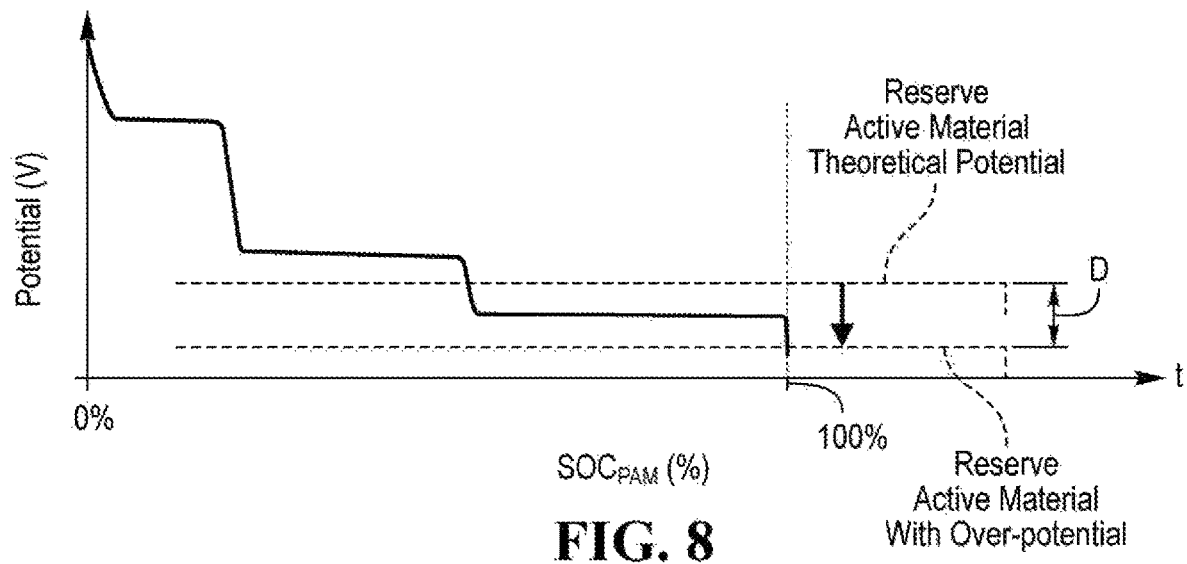
FIG. 8 is a graph of potential against state of charge with reserve active material theoretical and over-potential.

According to one or more embodiments, the reserve material may have a theoretical potential above the reaction potential of the primary material, but may not intercalate with lithium at that potential due to its overpotential. Instead, the reserve material may intercalate with lithium at a potential between the primary material reaction potential and the lithium reaction potential. This mechanism is illustrated in FIG. 8, where "D" shows the difference between the theoretical potential of the reserve active material and the reserve active material with over-potential.

Accordingly, a Li-ion battery including an anode having a reserve active material is disclosed. The reserve material provides an active additive "reserve" material mixed within or layered on the anode that is activated only when the potential of the cell drops below that of the primary active material when at its fully intercalated state, such that lithium intercalates with the reserve material instead of plating on the anode. Although typical additives for anodes include active materials for improving cell capacity, the materials are activated simultaneously with or prior to the graphite intercalation, thus the conventional cells may still have lithium plating issues on the anode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating a Li-ion battery comprising: responsive to a primary active material in an anode of the battery being fully intercalated at 100% SOC and an anode potential of the battery locally dropping below a primary active material potential at an interface between the anode and a separator upon conclusion of normal operation, irreversibly intercalating a layer of an anode reserve material with lithium at the interface, wherein the reserve material is SrO, $Mn_4N$, $K_2SO_4$, $CaCl_2$, $CaF_2$, $SrF_2$, Ag, Mg, or Zn and has a reaction potential between 0 and 0.1 volts and is not reactive with lithium until the anode potential locally drops at the interface when the primary active material is fully intercalated to inhibit lithium plating on the anode.

2. The method of claim 1, wherein the anode includes the anode reserve material mixed with the primary active material, a conductive carbon, and a polymer binder.

3. The method of claim 1, wherein the anode reserve material forms a layer disposed on a surface of the anode between the anode and a separator.

* * * * *